United States Patent [19]

Weeks et al.

[11] Patent Number: 5,121,276
[45] Date of Patent: Jun. 9, 1992

[54] INSERTABLE TAPE CARTRIDGE FOR VIDEOCASSETTE HAVING A REEL RESTRAINING MEMBER

[75] Inventors: Jerrold K. Weeks, Hudson, Wis.; James E. Skavnak, Minneapolis; Thomas A. Turgeon, Fridley, both of Minn.

[73] Assignee: Minnesota Mining and Manufacturing Company, St. Paul, Minn.

[21] Appl. No.: 741,182

[22] Filed: Jul. 29, 1991

Related U.S. Application Data

[63] Continuation of Ser. No. 343,851, Apr. 26, 1989, abandoned.

[51] Int. Cl.5 .............................................. G11B 23/02
[52] U.S. Cl. ..................................... 360/132; 242/195
[58] Field of Search ................... 360/132, 128, 94, 95; 242/195, 198, 197–201, 204; 352/72, 78 R, 158

[56] References Cited

U.S. PATENT DOCUMENTS

| | | |
|---|---|---|
| 29,976 | 4/1879 | Schoettle et al. . |
| 3,066,880 | 12/1962 | Bauer et al. . |
| 3,150,840 | 9/1964 | Briskin et al. . |
| 3,197,150 | 7/1965 | Camras . |
| 3,800,321 | 3/1974 | Bolick, Jr. . |
| 3,900,170 | 8/1975 | Serizawa . |
| 3,900,172 | 8/1975 | Kamaya . |
| 4,019,695 | 4/1977 | Wharam . |
| 4,185,307 | 1/1980 | Sato . |
| 4,426,047 | 1/1984 | Richard et al. . |
| 4,452,406 | 6/1984 | Richard . |
| 4,452,407 | 6/1984 | Ogata et al. . |
| 4,479,618 | 10/1984 | Okada et al. . |
| 4,524,926 | 6/1985 | Nemota et al. . |
| 4,536,810 | 8/1985 | Umeda . |
| 4,554,603 | 11/1985 | Tsuchiya . |
| 4,566,048 | 1/1986 | Tomunaya et al. . |
| 4,567,536 | 1/1986 | Tsuchiya . |
| 4,572,460 | 2/1986 | Hertrich . |
| 4,595,962 | 6/1986 | d'Alayer de Costemore d'Arc . |
| 4,602,300 | 7/1986 | Ogata et al. . |
| 4,622,605 | 11/1986 | Tsuruoka et al. . |
| 4,920,436 | 4/1990 | Novak . |

FOREIGN PATENT DOCUMENTS

| | | |
|---|---|---|
| 0146311 | 6/1985 | European Pat. Off. . |
| 0201156 | 11/1986 | European Pat. Off. . |
| 0272556 | 6/1988 | European Pat. Off. . |

Primary Examiner—A. J. Heinz
Attorney, Agent, or Firm—Merchant, Gould, Smith, Edell, Welter & Schmidt

[57] ABSTRACT

A removable tape cartridge (14) for insertion into a carrier (12) in order to form a two-piece videocassette (10) comprises a housing (20) with a tape reel assembly (30) therein. The tape reel assembly (30) includes a length of tape (56) with a connector (64) at one end which, upon insertion of the cartridge (14), mates with an associated connector (15) in the carrier (12) to establish connection with a tape-up reel (17). The tape reel assembly (30) is supported within the housing (20) for limited floating movement between up and down positions, but is normally biased toward the down position by a hold down ring (74). A clutch (66–70) provides controlled tape slippage within the tape reel assembly (30), which is normally secured against unwinding by a brake assembly (102–116) until the cartridge (14) has been inserted into the carrier (12).

3 Claims, 5 Drawing Sheets

INSERTABLE TAPE CARTRIDGE FOR VIDEOCASSETTE HAVING A REEL RESTRAINING MEMBER

This is a continuation of application Ser. No. 07/343,841, filed Apr. 26, 1989 now abandoned.

TECHNICAL FIELD

The present invention relates generally to magnetic tape cartridges. More particularly, this invention concerns a compact tape cartridge for use with a carrier in order to form a two-piece videocassette which is fully compatible with existing videocassette recorders.

BACKGROUND ART

Videocassette players and recorders (VCRs) have become quite popular and their popularity is expected to continue increasing. One of the reasons for this popularity is the wide variety of programming which is available, either by direct recording for playback and personal use later or by purchase or rental of pre-recorded videocassettes. Such videocassettes are generally available in standardized formats, with the VHS format currently being the most popular. The videocassette itself generally consists of a closed housing having a length of tape connected at its ends to a pair of reels therein between which the tape is wound or unwound during play or rewind as the case may be. The tape is generally guided between the reels along a tape path extending along the front end of the cassette for interaction with a tape head within the VCR, and a pivotal door is usually provided on that end for protecting the exposed tape before the videocassette has been inserted into the VCR.

Conventional videocassettes are not particularly bulky, however, the available storage space is usually limited and so their storage can become a problem as one's collection of videocassettes increases. This problem is expected to worsen with the increasing popularity of VCRs and the increasing size of videocassette libraries used with them. As this occurs, we expect that the available space for storage of the videocassettes will at some point have the practical effect of limiting the number of videocassettes which can be kept and used.

Videocassette adapters have been available heretofore for adapting relatively small cassettes for use with standard formats. Such adapters generally consist of a housing into which the small cassette can be inserted, for example, through a releasable top door. After insertion, a mechanism in the adapter is manually activated to pull the tape out from the supply and take-up reels in the cassette to which it is connected, and guide the tape along the proper path for playback or recording upon insertion of the adapter into the VCR. Such adapters are typically used with small cassettes from camcorders, but have limited tape capacity and playing time. For example, the small cassettes used with such adapters typically have a maximum playing time of only about 20 minutes versus up to about 2-6 hours (depending upon speed) with a standard size videocassette. U.S. Pat. No. 3,677,494 to Protas, U.S. Pat. No. 4,432,510 to Ogata, U.S. Pat. No. 4,504,876 to Nagaoka, and U.S. Pat. No. 4,567,536 to Tsuchiya are representative of the prior art in this regard. Such adapters do not address the problem of achieving more efficient tape storage without sacrificing capacity and playing time.

A need has thus arisen for a compact tape cartridge which provides the same or better capacity when inserted into a carrier in order to form a standard videocassette, but which makes for better use of available storage space when removed from the carrier.

SUMMARY OF INVENTION

The present invention comprises an insertable tape cartridge which overcomes the foregoing and other difficulties associated with the prior art. In accordance with the invention, there is provided a tape cartridge for use with a carrier having a take up reel therein in order to form a videocassette which can then be used in the usual fashion, except that many such tape cartridges could be stored in the same available space while requiring only one such carrier. The tape cartridge herein provides the same or better capacity, but requires only half the storage space of a standard videocassette.

The tape cartridge comprises a housing having a rotatable reel assembly therein containing a supply of magnetic tape. One end of the tape is secured to the reel assembly, while the other end of the tape extends around guide rollers to a connector normally retained in a predetermined position on the outside of the housing for mating engagement with another connector in the carrier which is connected to the take up reel, in order to establish tape connection upon insertion of the cartridge into the carrier. The tape reel assembly preferably "floats" within the housing between predetermined up and down positions, but is normally biased toward the down position when not inserted into the carrier. A slip clutch is provided for tape protection against over tensioning on the tape reel assembly. A brake mechanism is provided for normally constraining the tape reel assembly against unwinding when not inserted into the carrier. Locating surfaces are provided on the housing to assure proper positioning of the tape cartridge during insertion, and a manual detent is also provided for securing the tape cartridge in place after insertion into the carrier. In accordance with the preferred embodiment, an interlock mechanism is provided to release the tape reel assembly for limited floating movement after the cartridge has been fully inserted into the carrier.

BRIEF DESCRIPTION OF DRAWINGS

A better understanding of the invention can be had by reference to the following Detailed Description in conjunction with the accompanying Drawings, wherein.

DETAILED DESCRIPTION

Figure 1:
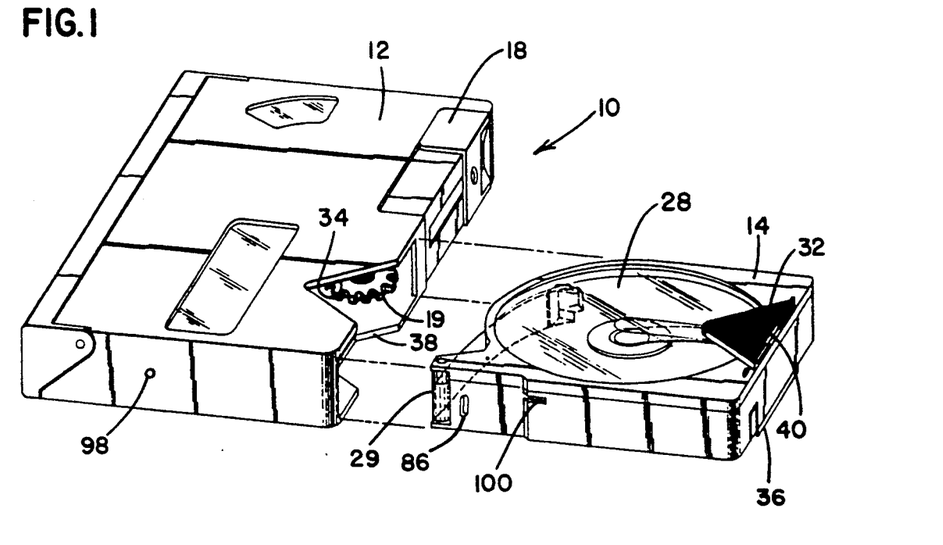
FIG. 1 is a exploded perspective view of a two-piece videocassette incorporating the tape cartridge of the invention.
Figure 2:
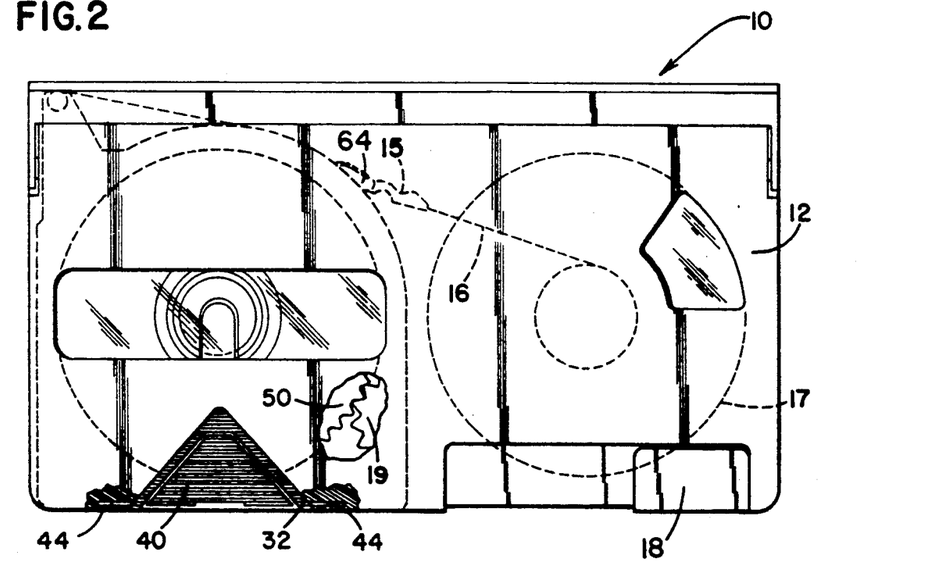
FIG. 2 is an enlarged top view of the two-piece videocassette with the tape cartridge inserted therein, partially cut away.
Figure 3:
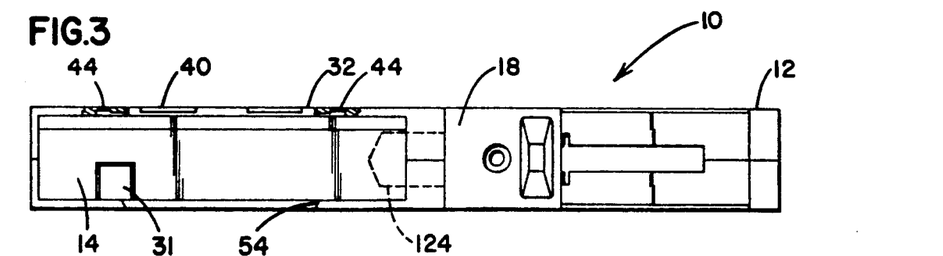
FIG. 3 is a rear end view of the two-piece video cassette, but with the slide in different position.

Referring now to the Drawings, wherein like reference numerals designate like or corresponding elements throughout the views, and particularly referring to FIGS. 1-3, there is shown a two-piece videocassette 10 comprising a carrier 12 and a removable tape cartridge 14 incorporating the invention. FIG. 1 shows the cartridge 14 ready for insertion into carrier 12. The carrier 12 includes a connector 15 secured to one end of a leader 16 secured at its other end to a take up reel 17 to which the tape from cartridge 14 can be connected for winding or unwinding in response to manual actuation via slide 18. FIG. 1 shows the slide 18 in the "home" or "load" position on the carrier 12, ready for insertion of the tape cartridge 14. FIG. 2 shows the slide 18 in the same position, but after insertion of tape cartridge 14 into the carrier 12 in driver engagement with gear 19 which is part of the tape advance mechanism (not shown) within the carrier which is manually actuated via slide 18. FIG. 3 shows the slide 18 in the "ready play" position after insertion of the tape cartridge 14 into the carrier 12, ready for insertion of the videocassette into a VCR, camcorder, or the like. Movement of slide 18 completes connection of the tape from cartridge 14 to take-up reel 17 and establishes the proper tape path within carrier 12 for playback or recording.

Figure 4:
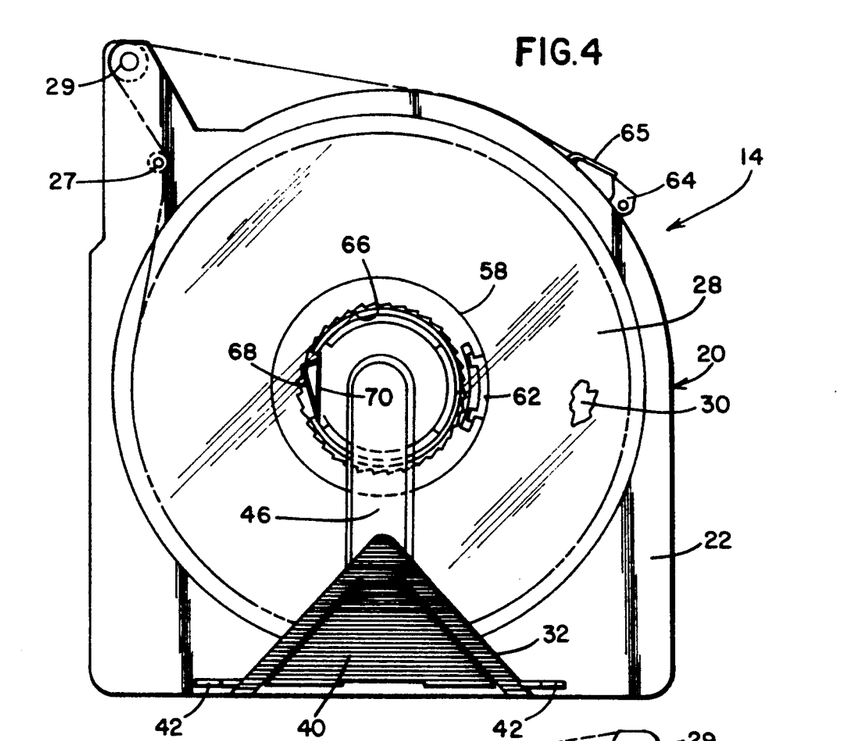
FIG. 4 is an enlarged top view of the tape cartridge.
Figure 5:
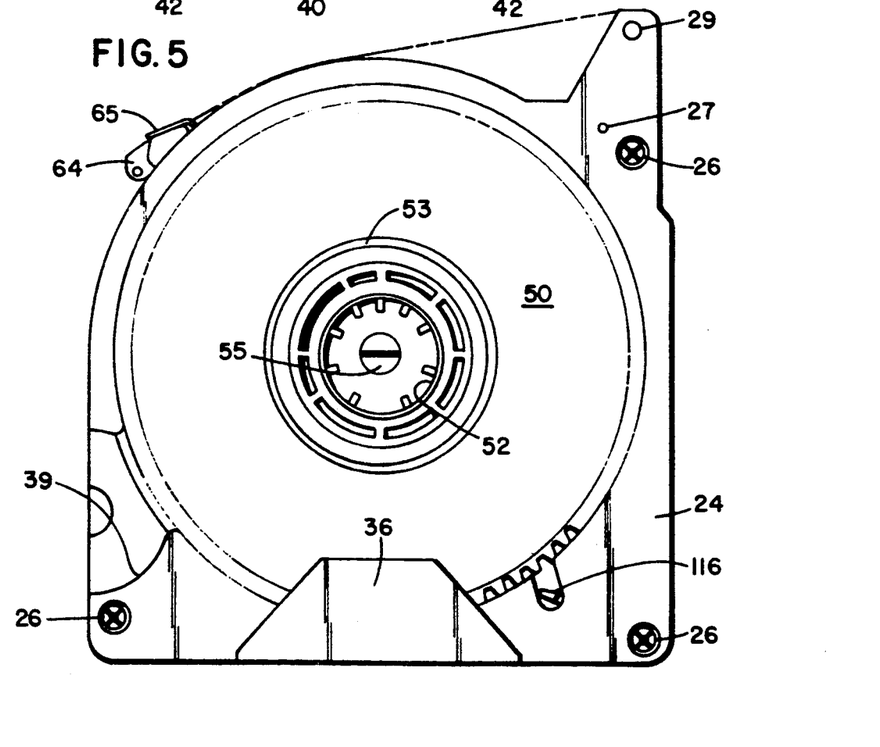
FIG. 5 is an enlarged bottom view of the tape cartridge.

Referring now to FIGS. 4 and 5, the tape cartridge 14 includes a housing 20 consisting of a top cover 22 and a bottom cover 24 secured together by screws 26. The top cover 22 preferably, includes a substantially clear or transparent window 28 through which the reel assembly 30 can be seen therein. The top cover 22, bottom cover 24 and window 28 can be formed of any suitable material, such as plastic. A guide pin 27 and roller 29 are secured between covers 22 and 24 for guiding tape into and out of the tape cartridge 14. As is best seen in FIG. 3, a conventional breakout tab 31 is provided for disabling recording to prevent inadvertently recording over prerecorded material on the cartridge 14.

The tape cartridge 14 includes locating structure to assure proper orientation thereof upon insertion into the carrier 12. In particular, the top housing cover 22 includes a raised triangular piece or member 32 centered and adjacent to the rear end of the tape cartridge 14. The triangular member 32 is adapted for receipt by a complementary notch 34 in the top of the carrier 12, as is best seen in FIG. 1. Similarly, another raised member 36 is provided on the bottom cover 24 in centered position adjacent to the rear end thereof. The bottom member 36, which is also tapered but of different overall shape from the top member 32, is adapted for receipt in another complementary notch 38 located in the bottom of the carrier 12. As illustrated, the top locating member 32 is of triangular shape and the bottom locating member 36 is of trapezoidal shape, however, other suitable shapes can be used provided they are different so that the tape cartridge 14 cannot inadvertently be inserted into the carrier 12 while reversed and/or inverted. Locating members 32 and 36 and notches 34 and 38 facilitate proper alignment of the tape cartridge 14 for mating engagement with connector 15 in the carrier 12.

The underside of bottom cover 24 also includes a recess 39 for receiving the gear 19 in carrier 12 after insertion of the tape cartridge 14.

In accordance with the preferred construction, a manual spring latch is provided for releasably securing the tape cartridge in place after insertion into the carrier 12. In particular, the latch comprises a thumb tab 40 secured to a pair of opposite detents 42 which are adapted to engage recesses 44 in the underside of the top of carrier 12, which recesses are on opposite sides of notch 34. The tab 40 and detents 42 are preferably formed from one integral piece, with the tab being inset in a central cutout within the top member 32. The tab 40 and detents 42 are normally biased upwardly by one end of a leaf spring 46 which is secured between its ends to the underside of window 28 by means of conventional heat stakes or other suitable connectors extending between the spring, window 28, and top member 32. The other end of the spring 46 bears against the reel assembly 30 and urges it downwardly. It will thus be appreciated that the tape cartridge 14 includes a manually releasable latch arrangement by which it can be secured in place within the carrier 12.

Figure 6:
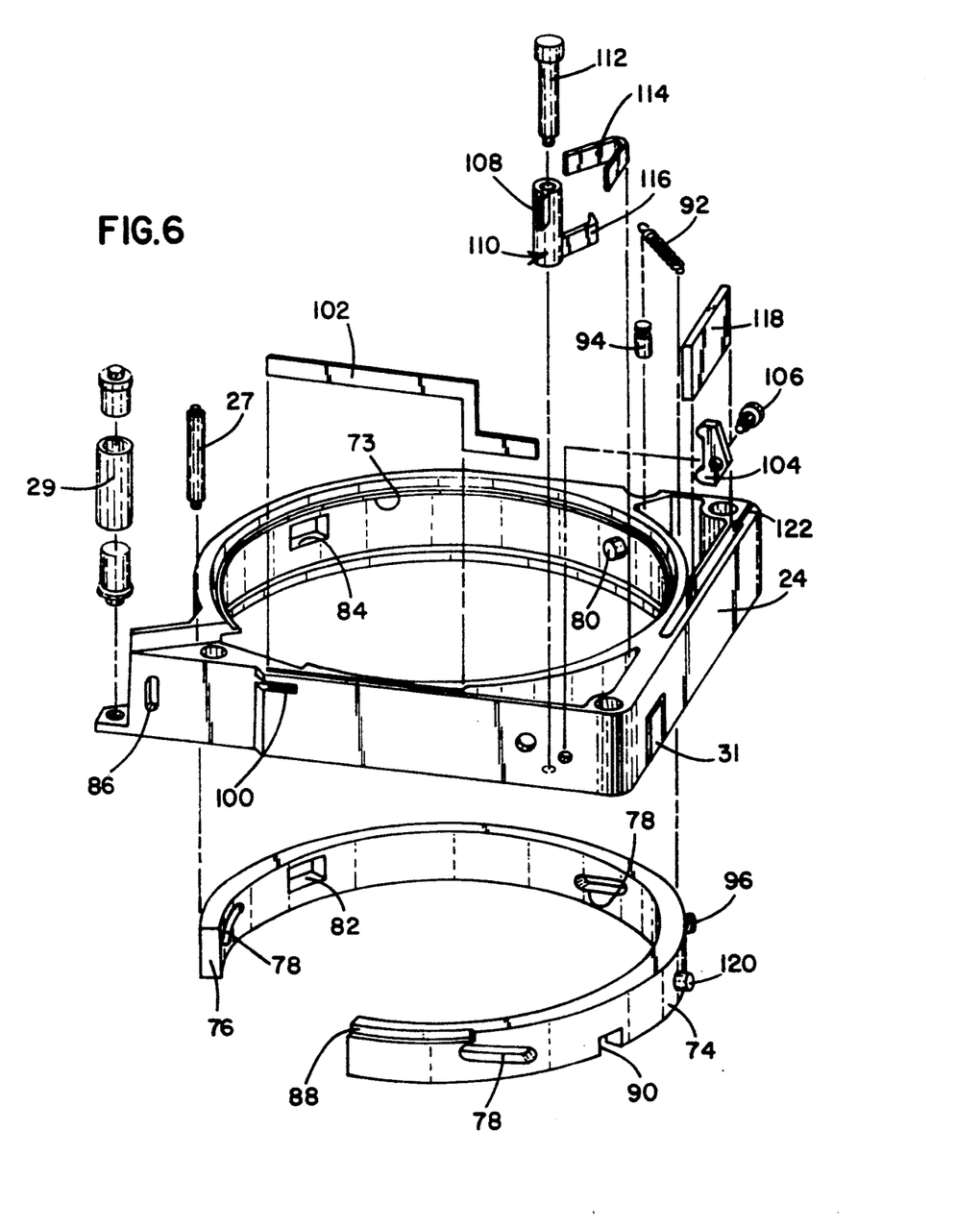
FIG. 6 is an exploded view of the bottom portion of the cartridge housing.
Figure 7:
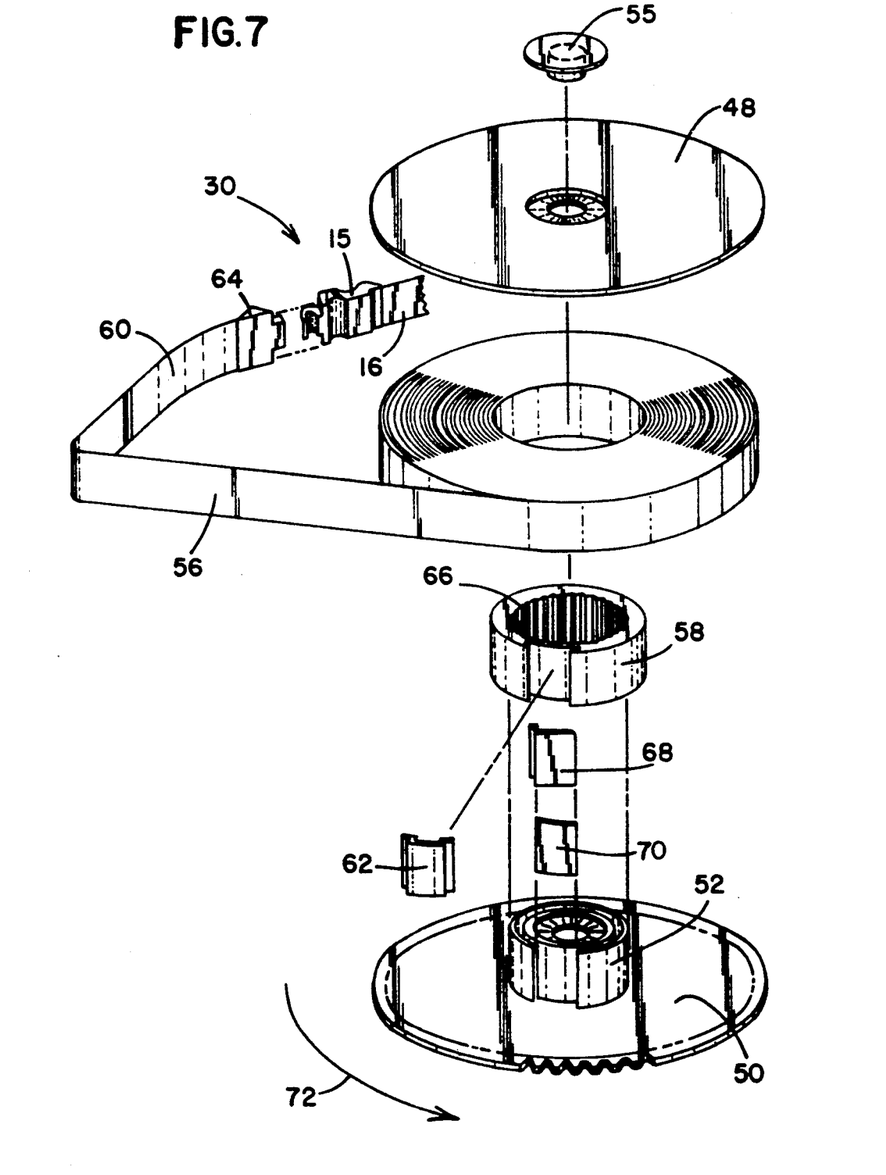
FIG. 7 is an exploded view of the tape reel assembly.

Referring now to FIGS. 5-7, the tape reel assembly 30 includes a top flange 48 and a bottom gear flange 50. The bottom gear flange 50 includes a central hub 52 which is fixed or preferably integral therewith for rotation in unison, the flange 50 having gear teeth disposed around its circumference as shown in FIG. 5. The inside of hub 52 is preferably splined as best seen in FIG. 5, for engagement with a drive spindle (not shown) through a central hole in the bottom gear flange 50 when the tape cartridge 14 is inserted into the carrier 12 and the carrier has been inserted into the videocassette recorder and lowered into play position. A beveled collar 53 is preferably provided about the underside of hub 52 for cooperation with a beveled opening 54 in the bottom of carrier 12, as seen in FIG. 3, for proper alignment with the drive spindle. The top flange 48 is secured onto hub 52 by means of a snap button 55. Serrations are provided on opposite adjoining surfaces of flange 48 and hub 52 so that the top flange cannot turn relative to the hub and bottom gear flange 50.

A length of magnetic tape 56 and a clutch ring 58 are provided between the upper and lower flanges 48 and 50. The length of magnetic tape 56 preferably includes a substantially clear or transparent leader 60 spliced in conventional fashion at each end thereof. For purposes of illustration, only the leader 60 at the outer end has been shown, however, it will be understood that a similar leader is spliced to the inner end of the tape which is secured at its free end to the clutch ring 58 by clip 62. The leader 60 at the outer end of tape 56 is secured at its free end to a connector 64, which is normally retained in a clip 65 in a predetermined position on housing 20 for mating engagement with the corresponding connector 15 in carrier 12 upon insertion of the tape cartridge 14.

The clutch ring 58 includes a smooth exterior surface about which the tape 56 is wound, however, the inside surface thereof includes splines 66, and a pawl 68 and spring 70 are located in a notch in the exterior of hub 52 between the hub and clutch ring in order to form a slip clutch arrangement. This clutch arrangement allows rotation of the bottom gear flange 50, hub 52 and clutch ring 58 in the direction indicated by arrow 72 in order to permit winding of the tape 56 into the tape cartridge 14, as well as continued rotation of the reel assembly 30 after connector 64 seats in clip 65. For example, when the tape 56 has been fully wound into the cartridge 14 with connector 64 seated in clip 65, such as during rewind, the bottom gear flange 50 and hub 52 can continue rotating within clutch ring 58 without over tensioning tape 56. Spring 70 determines the torque or load at which the clutch arrangement slips to protect tape 56 against breakage while allowing overtravel of gear flange 50 in the rewind direction. This comprises an important feature of the present invention.

Referring particularly to FIG. 6, the tape reel assembly 30 is constrained for limited floating movement within the bottom housing cover 24 between lip 73 and hold down ring 74. The ring 74 has been omitted from FIG. 7 in the interest of clarity, however, it will be appreciated that the ring suspends tape 56 and is located between lip 73 and the bottom gear flange 50. The hold down ring 74 is not continuous, but includes an opening 76 therein for passage of the tape 56. The ring 74 also includes diagonal slots 78 by which it is supported on pins 80, only one of which is shown, in the bottom housing cover 24. It will thus be appreciated that ring 74 is constrained for limited rotation by slots 78 and pins 80, which also define predetermined upward and downward positions within the housing 20. When ring 74 is in its normal downward position, when cartridge 14 is outside carrier 12, it bears against the bottom gear flange 50 and thus holds down the reel assembly 30 against looseness within housing 20. Upon actuation of ring 74 to its upward position beneath lip 73, reel assembly 30 can "float" within the tape cartridge 14. This also comprises an important feature of the present invention.

In the preferred embodiment, an access hole 82 is also provided in the hold down ring 74 for selective alignment with other access holes 84 and 86 in the bottom housing 24 for optical sensing of the clear tape leader 60 to indicate end of tape. Notches 88 and 90 are also provided on the hold down ring 74 for mechanical clearance purposes.

Figures 8, 9:
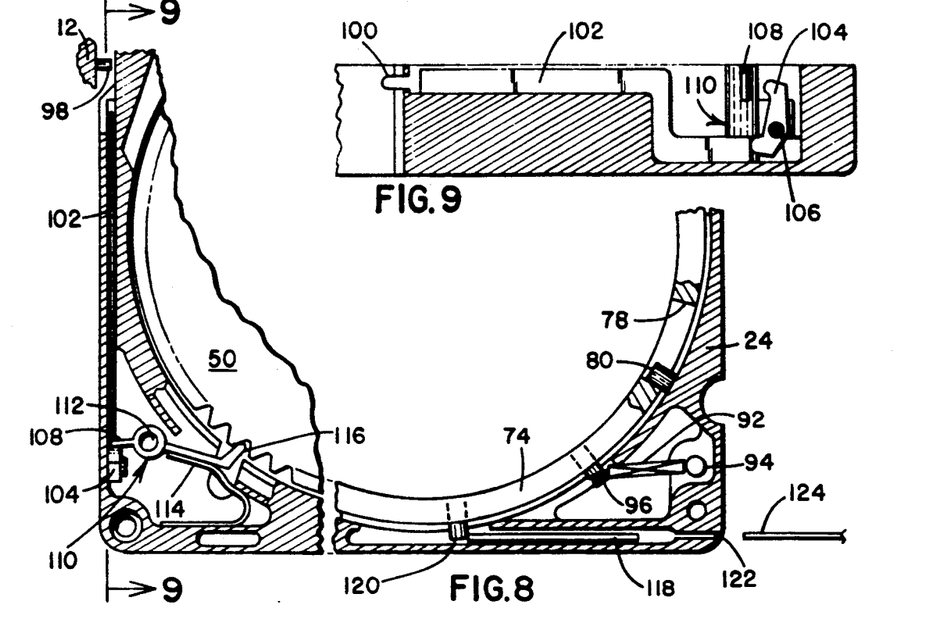
FIG. 8 is a detailed view showing positioning of the brake mechanism and hold-down ring before insertion of the tape cartridge.
FIG. 9 is a sectional view taken along lines 9—9 of FIG. 8 in the direction of the arrows.
Figures 10, 11:
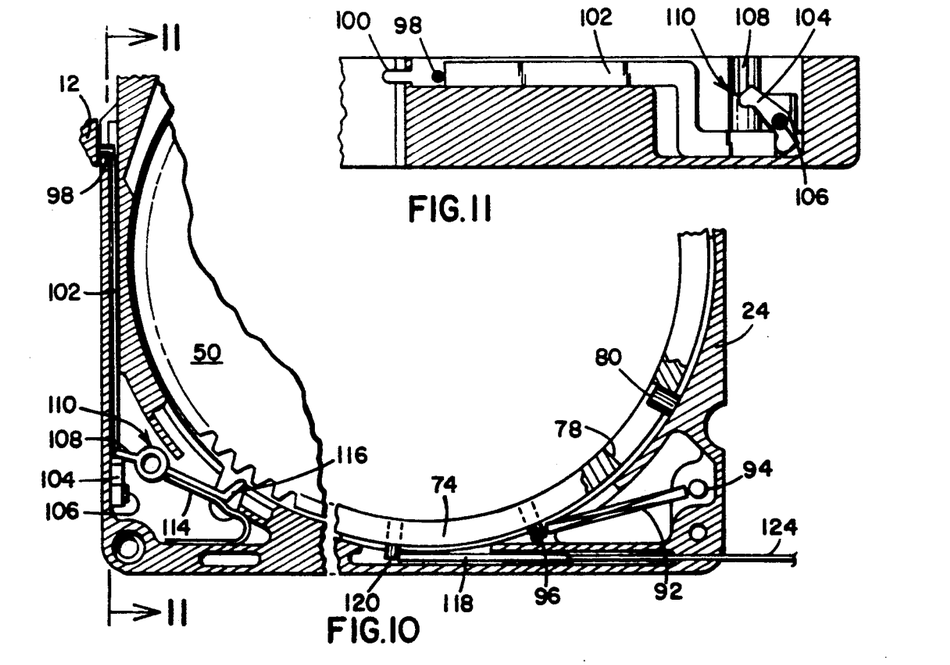
FIG. 10 is a detailed view showing positioning of the brake mechanism and hold-down ring after insertion of the tape cartridge.
FIG. 11 is a sectional view taken along lines 11—11 of FIG. 10 in the direction of the arrows.

As shown in FIG. 8, the hold down ring 74 and the reel assembly 30 are normally biased toward the down position by a spring 92 connected between a post 94 located within a cavity in the bottom housing cover 24 and a stud 96 on the outside of the ring extending through an access hole in the wall of the cavity.

Referring to FIGS. 8–11 in conjunction with FIG. 6, the tape cartridge 14 preferably includes an internal brake mechanism for securing the reel assembly 30 against unwinding movement unless inserted into the carrier 12. In particular, an actuator pin 98 is located on the inside of carrier 12. When the tape cartridge 14 is inserted into carrier 12, the pin 98 enters a slot 100 in the side of housing 20 and engages one end of a push rod 102 located within a cavity in the bottom housing cover 24. The other end of the push rod 102 engages one end of a bell crank 104 which in turn is supported by pin 106 on the bottom housing cover 24. This in turn causes the other end of the bell crank 104 to engage a tang 108 on sleeve 110 which is pivotally supported on post 112. This causes sleeve 110 to rotate against spring 114 normally urging its other tang 116 out of normal locking engagement with the bottom gear flange 50 of the reel assembly 30, which in turn releases the tape reel assembly 30 so that it can turn freely in either direction with the clutch ring 58 so that tape 56 can be wound or unwound from the tape cartridge 14 as desired. However, this brake mechanism does not affect the vertical "floating" position of the reel assembly 30 but only releases it for rotation during play or rewind upon insertion of cartridge 14 into carrier 12. This also comprises another important feature of the present invention.

The reel assembly 30 is fully released for the ready/play mode after insertion of the tape cartridge 14 into carrier 12 and actuation of the slide 18. In particular, a free push bar 118 is constrained for sliding movement within another cavity adjacent to the front of the bottom housing cover 24. The push bar 118 is movable into and out of engagement with another lug 120 on the support ring 74 extending through an access opening in the inside cavity wall. A small access slot 122 opens outwardly from one end of the cavity containing the push bar 118. As the slide 18 is moved from the home position shown in FIG. 1 to the ready/play mode position shown in FIG. 3, an extension 124 on the slide 18 enters slot 122 and engages the push bar 118, which in turn pushes the lug 120 on the ring 74 against the tension of spring 92, thus turning it to the upward position in order to release the tape reel assembly 30 for limited float to accommodate tolerance after the videocassette 10 is inserted into the recorder and lowered into the drive spindles thereof.

From the foregoing, it will thus be apparent that the present invention comprises a tape cartridge for use with a carrier to form an improved two-piece videocassette having several advantages over the prior art. One significant advantage involves the fact that the cartridge includes a supply of tape with a connector at one end which, upon insertion into the carrier, mates with a corresponding connector therein to establish connection between the supply and take-up reels. Various locating and interlocking means are provided to assure proper positioning of the tape cartridge within the carrier and to secure the reel assembly and prevent inadvertent unwinding of the tape before the cartridge has been properly inserted and secured in place within the carrier. The tape cartridge herein has the same or better tape capacity but is compact for best space utilization. Other advantages will be evident to those skilled in the art.

Although particular embodiments of the invention have been illustrated in the accompanying Drawings and described in foregoing Detailed Description, it will be understood that the invention is not limited only to the embodiments disclosed, but is intended to embrace any alternatives, equivalents, modifications and/or rearrangement of elements falling within the scope of the invention as defined by the following claims.

What is claimed is:

1. A tape cartridge comprising:
   a tape supply reel having a first top flange; a second bottom flange and a central hub;
   a housing, having an interior, said interior adapted to support said tape supply reel in a first floating position which permits axial rotation and lateral compliance of said supply reel within said housing;
   said interior adapted to support said tape supply reel in a second non floating position which limits translational movement of said tape supply reel within said housing;
   a rotatable hold down ring, having an annular aperture to receive and position said tape supply reel, located in said housing, and adapted for partial rotation through a predetermined arc, said hold down ring movable from a, first up position, corresponding to said floating position of said reel, to a, second down position, corresponding to said non floating position, in response to hold down ring rotation through said predetermined arc, whereby, said hold down ring moves said tape supply reel into engagement with said housing when said hold down ring is rotated into said down position and said hold down ring releases said tape supply reel when said hold down ring is rotated into said up position.

2. The tape cartridge of claim 1 further comprising:

a push bar supported for movement in said housing, said push bar having a first end, and a second end;

said first end coupled to said rotatable hold down ring, and said second end proximate an opening in said housing permitting external actuation of said second end.

3. The tape cartridge of claim 1 further comprising:

spring means for biasing said hold down ring toward said down position.

* * * * *

UNITED STATES PATENT AND TRADEMARK OFFICE
CERTIFICATE OF CORRECTION

PATENT NO. : 5,121,276
DATED : June 9, 1992
INVENTOR(S) : J. K. Weeks, et al.

It is certified that error appears in the above-identified patent and that said Letters Patent is hereby corrected as shown below:

Under INSERTABLE TAPE CARTRIDGE FOR VIDEOCASSETTE HAVING A REEL RESTRAINING MEMBER, col. 1, line 7, please delete "07/343,841" and insert therefor --07/343,851--.

Signed and Sealed this

Twenty-fourth Day of August, 1993

Attest:

BRUCE LEHMAN

*Attesting Officer*    *Commissioner of Patents and Trademarks*